INVENTOR
Homer P. Witzel
BY
Webster & Webster
ATTYS

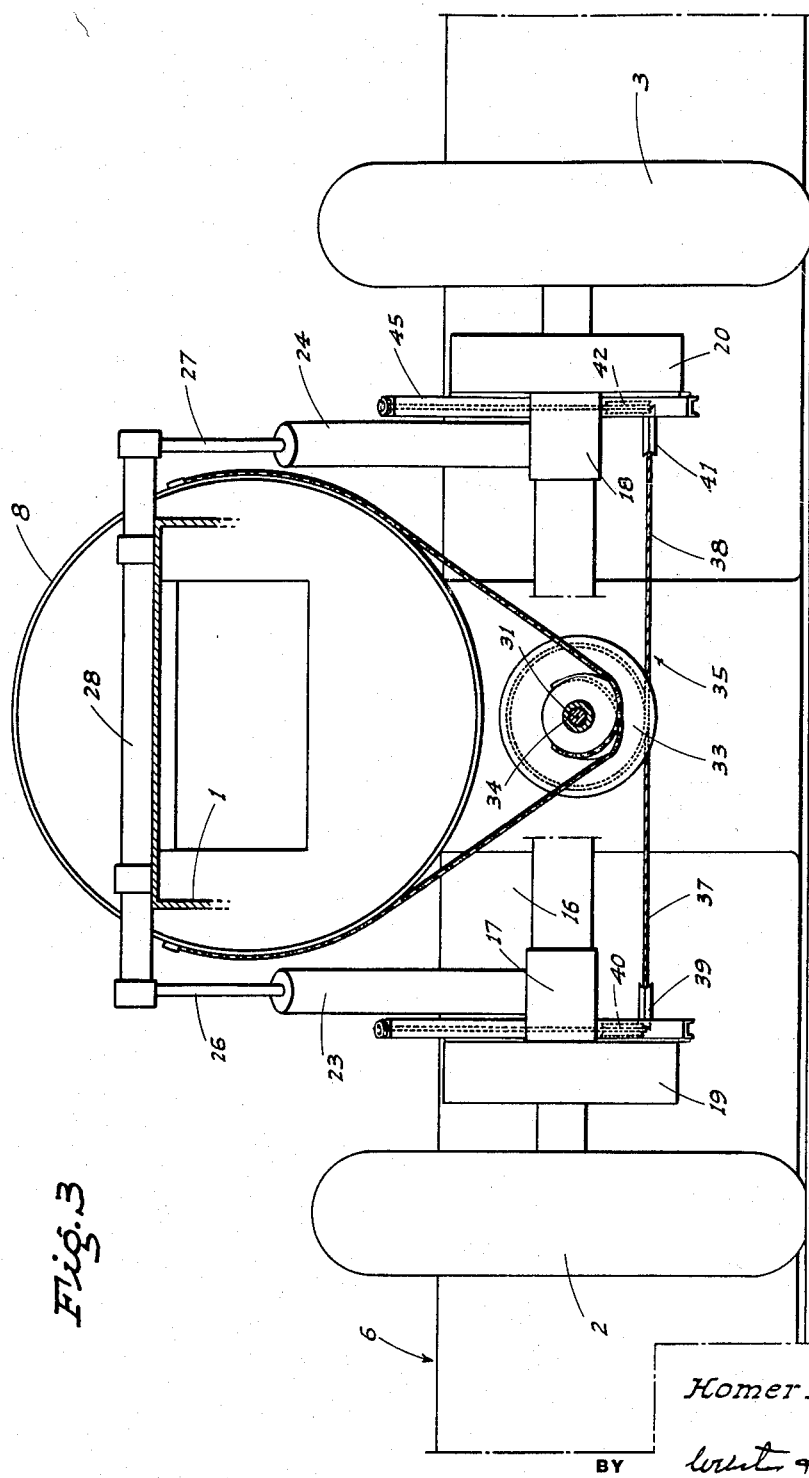

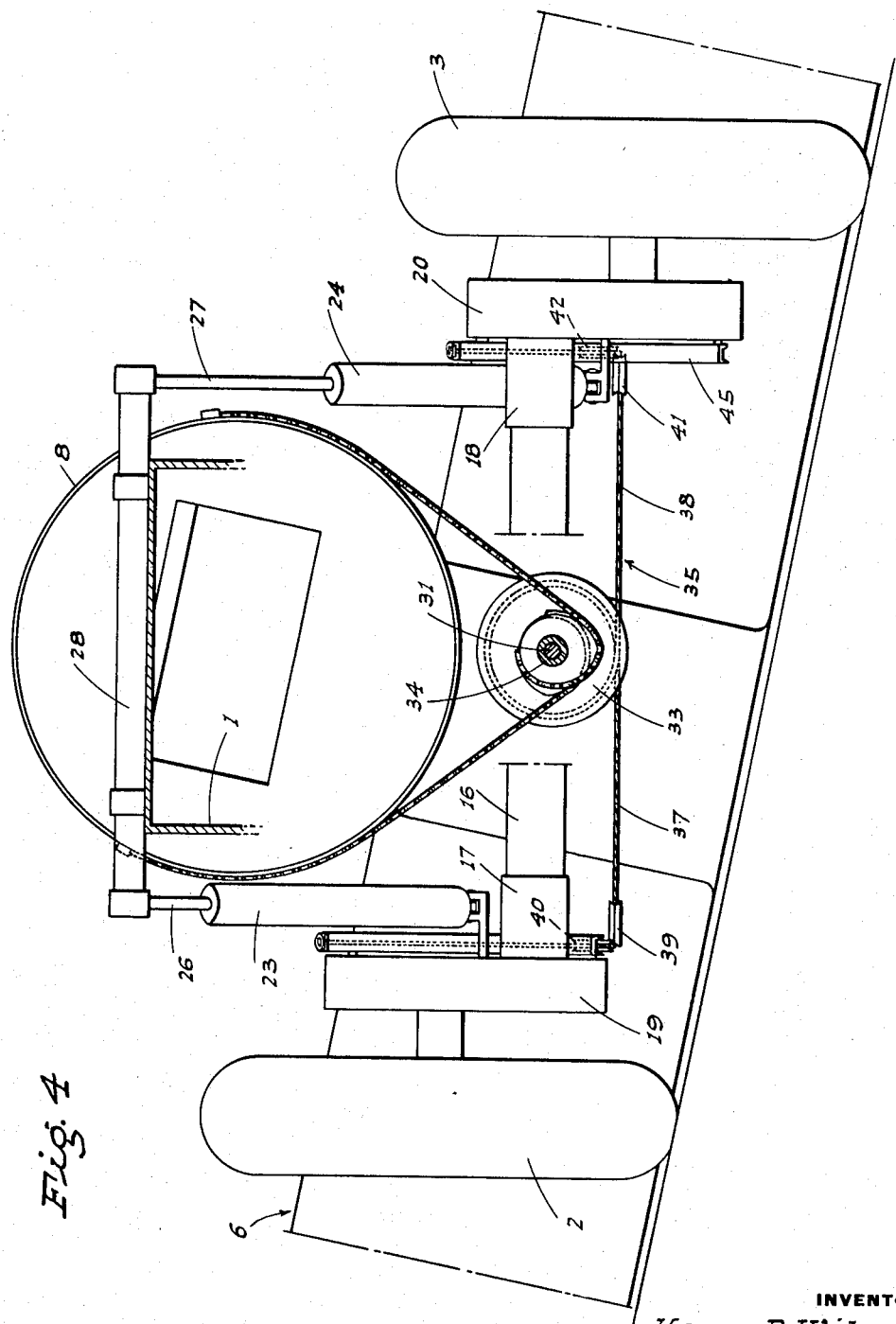

April 17, 1956　　　　H. D. WITZEL　　　　2,742,298
LEVELING MECHANISM FOR HARVESTERS

Original Filed April 10, 1951　　　　　　　5 Sheets-Sheet 5

INVENTOR
Homer D. Witzel
BY
ATTORNEYS

United States Patent Office 2,742,298
Patented Apr. 17, 1956

2,742,298

LEVELING MECHANISM FOR HARVESTERS

Homer D. Witzel, Moline, Ill., assignor to Harris Manufacturing Company, Stockton, Calif., a corporation of California Original application April 10, 1951, Serial No. 220,303, now Patent No. 2,656,668, dated October 27, 1953. Divided and this application August 31, 1953, Serial No. 377,454

2 Claims. (Cl. 280—6)

This invention relates to sidehill harvesters, the instant application being a divisional application of my application on Header Mount for Side Hill Harvesters, Serial No. 220,303, filed April 10, 1951, now Patent No. 2,656,668, dated October 27, 1953.

In a harvester of this type, it is essential that the body of the harvester, in which the threshing mechanism is mounted, shall be maintained on a level transversely, regardless of the slope of the hill which the harvester may be traversing.

The harvester body is, of course, mounted on supporting wheels, and the principal object of the present invention is to provide a novel means for adjusting the wheels in opposition as the slope of the side hill may require, and to insure the same opposed movement of both wheels so as to maintain the body of the harvester on a definite transverse horizontal level.

The harvester includes front and rear wheels in pairs, the above-mentioned adjusting means being manually controlled and applied to the front wheels; and another object of the invention is to so mount the rear wheels that they will automatically accommodate themselves to the transverse slope without attention as the harvester traverses the hill so that the harvester body will be maintained level without any twisting strains being imparted thereto.

It is a further object to provide a practical body leveling device for a harvester, which structure will be exceedingly effective for the purpose for which it is designed.

These objects are accomplished by means of such structure and relative arrangement of parts as will fully appear by a persusal of the following specification and claims.

In the drawings:

Fig. 3 is a transverse view, with various parts omitted, and looking forwardly, substantially on line 3—3 of Fig. 1; the header being in a horizontal position and the parts of the control mechanism being in their corresponding positions.

Fig. 4 is a similar view, but shows the header as tilted so as to remain parallel to a side hill.

Figure 1:
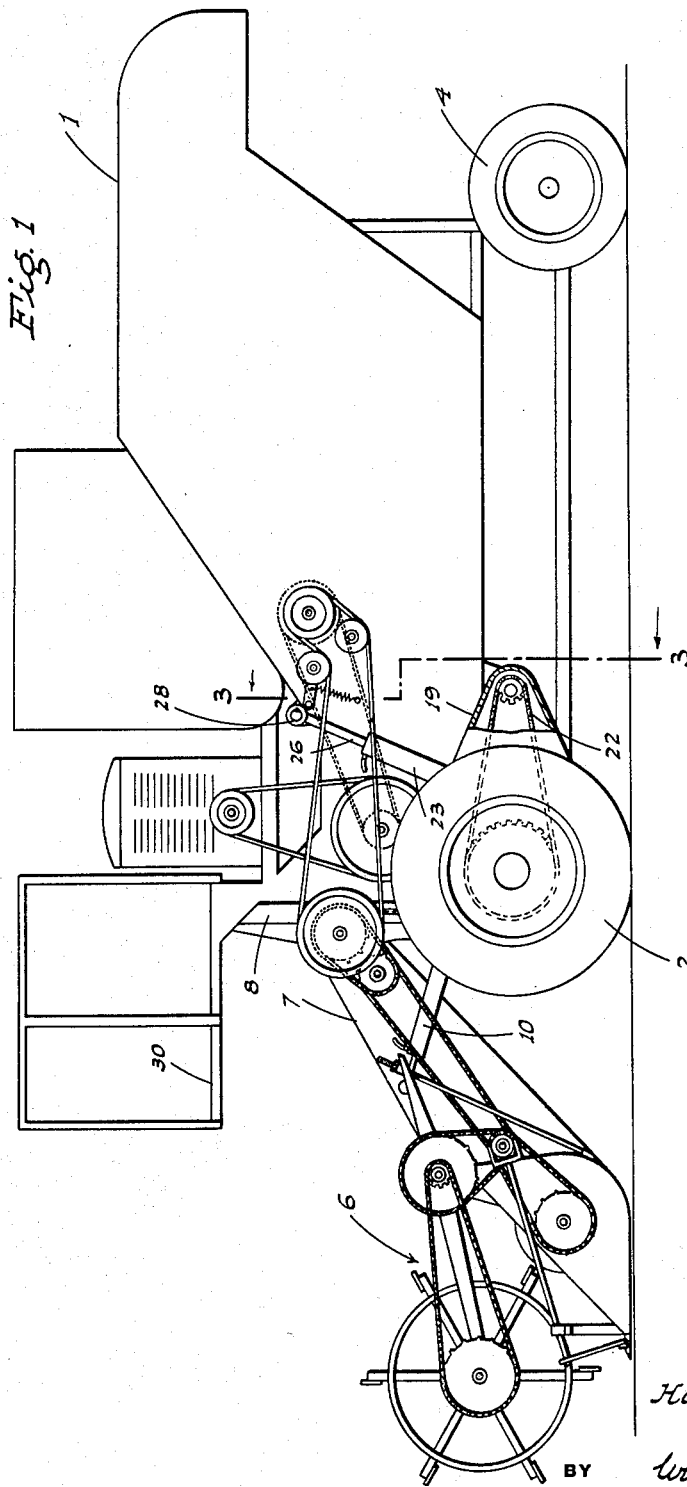
Fig. 1 is a side elevation, partly broken out and in section, of a side hill harvester, embodying the present invention.

Referring now more particularly to the characters of reference on the drawings, the harvester comprises an elongated body, indicated generally at 1, which is supported at the front by transversely spaced wheels 2 and 3, and at the rear by transversely spaced wheels 4 and 5.

The body 1 encloses the threshing and separating mechanism of the harvester as usual and as indicated in the aforementioned patent, and a header unit, indicated generally at 6, and constructed as in said patent, projects forwardly from the body. The header unit includes a rearwardly projecting spout 7 which is swivelly mounted on a disc and flange member 8 which is mounted for rotation about a longitudinal horizontal axis on a mounting ring 9 fixed on the front end of body 1. Hydraulic cylinder units 10 are connected between the member 8 and the spout 7 of the header unit to control the tilt thereof in a longitudinal vertical plane.

Figure 5:
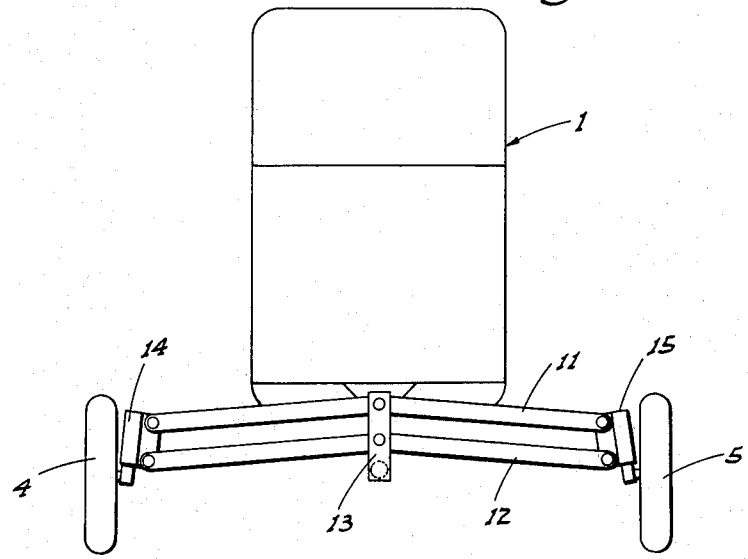
Fig. 5 is a reduced-scale rear end elevation of the harvester showing the rear wheel mount.

The rear wheels 4 and 5 are journaled in connection with opposite ends of a parallel linkage axle assembly A. This assembly comprises upper and lower transverse parallel arms 11 and 12, respectively, which are pivoted centrally between their ends on a bracket 13 depending from the harvester body 1 centrally of its width, as shown in Fig. 5. At their ends, arms 11 and 12 are pivoted on the spindle mounts 14 and 15 of the wheels 4 and 5, respectively.

The front wheels 2 and 3 are particularly mounted and controlled by the following structure:

Secured in connection with the underside of body 1, rearwardly of said wheels, is a cross member in the form of a tube 16. Journal sleeves 17 and 18 are turnable on tube 16 and are rigid with forwardly projecting radial housing-forming arms 19 and 20 on the forward end of which the wheels 2 and 3, respectively, are mounted. Each wheel is driven from a driven shaft 21 within tube 16 by suitable means such as a chain drive 22 within the corresponding housing so that the wheels 2 and 3 may be adjusted vertically and relative to each other without interfering with the driving thereof.

Figure 2:
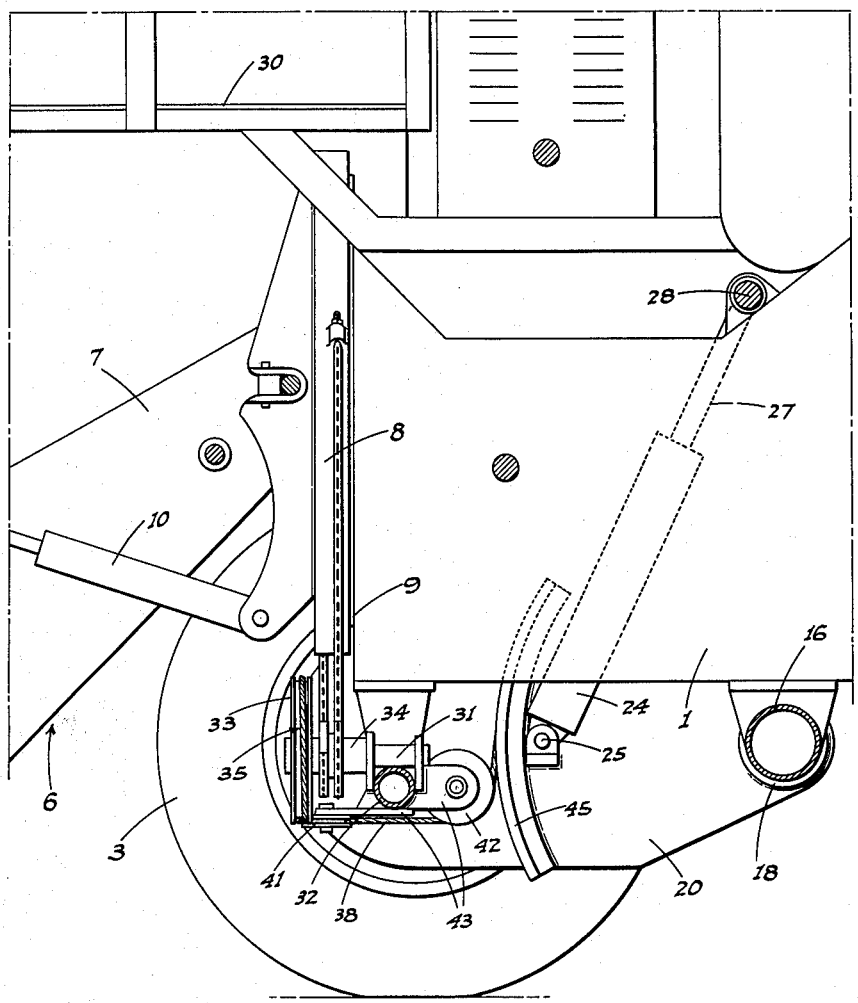
Fig. 2 is an enlarged fragmentary elevation, partly broken away and in section.

Said wheels 2 and 3 are adjusted up or down in opposition, so as to maintain the body 1 perpendicular when the harvester is traversing a side hill, by the following means:

Pivoted on the sides of body 1 are upstanding hydraulic cylinders 23 and 24 which are pivoted on the corresponding housings 19 and 20, respectively, as shown at 25 in Fig. 2. The upper end of the piston rods 26 and 27 of cylinders 23 and 24, respectively, are pivotally connected on a cross shaft 28 fixed on top of the body 1.

Figure 7:
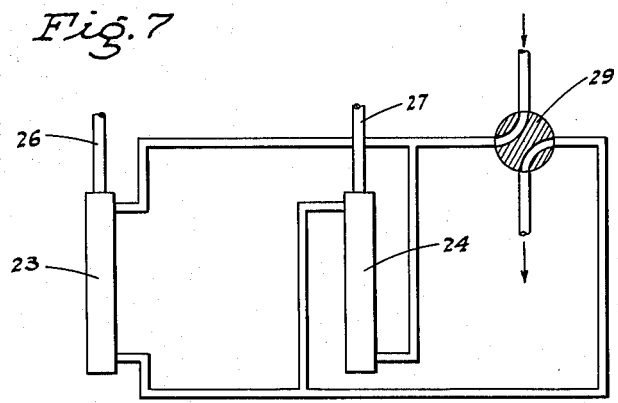
Fig. 7 is a diagram of the hydraulic header-spout control system.

The power cylinders 23 and 24 are actuated in opposition so that one extends while the other contracts, by means of any suitable control system, such as that shown diagrammatically in Fig. 7, and which includes a suitable conduit arrangement interposed in which is a four-way regulating valve 29. This valve is positioned so as to be accessible to the operator of the harvester stationed on an overhead platform 30 mounted on the harvester at the front end of the body.

Figure 6:
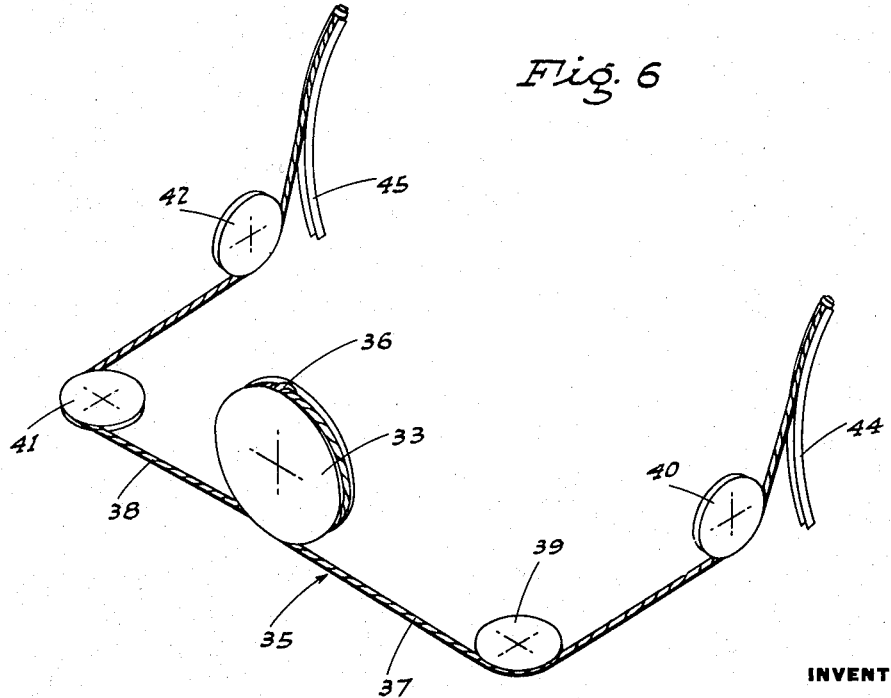
Fig. 6 is a diagram of the reeving of the control cable mechanism.

In order to positively prevent other than equal vertical adjustment of the wheels in opposition, the following cable system is provided:

A longitudinal stub spindle 31 is fixed on, and projects forwardly from, a cross member 32 secured under the forward end of the body ahead of the lower end of the body ahead of the lower end of the cylinders 23 and 24, as shown in Fig. 2; the spindle being centrally disposed between the housings 19 and 20, as shown in Figs. 3 and 4. A pulley 33 is turnably mounted on the spindle 31 by means of a hub 34, and a cable 35 is anchored centrally of its ends on said pulley, as shown at 36 in Fig. 6. From the anchor 36 the opposite runs 37 and 38 of the cable turn about the pulley 33 in opposite directions, leaving the pulley at the bottom and initially extending laterally therefrom.

One run 37 is then diverted rearwardly about a vertical axis sheave 39. Rearwardly of sheave 39 said cable run 37 turns upwardly under a transverse-axis sheave 40. Similarly, the other run 38 is diverted rearwardly by a vertical axis sheave 41 and then upwardly by a transverse axis sheave 42.

Both pairs of sheaves are mounted in connection with the cross member 32 by a suitable bracket arrangement 43 as shown in Fig. 2. Above the sheaves 40 and 42, the cable runs 37 and 38 engage and are anchored at their upper end to the upper end of upstanding arcuate cable guide shoes 44 and 45, respectively, and which are secured to corresponding housings 19 and 20 on the laterally inner side thereof. These guide shoes are of forwardly opening channel shape and are concentric to the axis of vertical swinging adjustment of the housings 19 and 20. The purpose of these shoes is to maintain, at all times, the same point of pull on the cable runs relative to the sheaves 40 and 42.

With this arrangement, it will be recognized that the front wheels are thus positively moved in opposite directions and to the same extent as the slope of the hill side may require to maintain the housing perpendicular. The mounting of the rear wheels, previously described, cause the same to automatically accommodate themselves to the ground as the front wheels are adjusted.

The rotation of the sheave 33 is also employed to turn the header unit 6 so that the sickle bar of the header unit will remain parallel to the ground, as shown in Figs. 3 and 4, and as fully set forth in said Patent No. 2,656,668.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a sidehill harvester having a body, and a pair of transversely spaced body-supporting front wheels adjustable vertically in opposition; a pair of rear body-supporting wheels, and means between the body and said rear wheels mounting the same for automatic vertical adjustment in opposition relative to each other as the front wheels are adjusted; said last named means comprising a pair of vertically spaced parallel transversely extending arms, means pivotally mounting the arms centrally of their ends on the body, wheel-spindle supporting brackets, and vertically spaced pivotal connections between the arms at their outer end and the brackets.

2. In a sidehill harvester having a body, a pair of transversely spaced body-supporting front wheels, a cross member mounted on and under the body rearwardly of the axes of the wheels, substantially horizontal arms turnable on the member and on which the wheels are mounted, and power means between the body and arms to swing the latter up and down in opposition; a pulley mounted on the body between the wheels and with its axis lengthwise of the harvester and disposed ahead of the cross member, a cable passing about the pulley and secured centrally of its ends thereon, the cable leaving the pulley in opposite directions as laterally extending runs, fixed direction-changing pulleys mounted to direct the runs rearwardly adjacent the inner face of the arms, other fixed direction-changing pulleys mounted to direct the rear end of the rearwardly directed portion of the runs in an upward direction, and arcuate cable guiding members concentric with the axis of turning of the arms, fixed on the arms rearwardly of but adjacent the last named pulleys; the cable runs rearwardly of the last named pulleys engaging said members in guided relation and being anchored thereon at one end thereof.

References Cited in the file of this patent

UNITED STATES PATENTS

| | | |
|---|---|---|
| 657,700 | Holt | Sept. 11, 1900 |
| 764,205 | Reynolds | July 5, 1904 |
| 1,652,806 | Apel | Dec. 13, 1927 |
| 1,941,143 | Wickersham | Dec. 26, 1933 |
| 2,000,230 | Heise | May 7, 1935 |
| 2,488,592 | Hamilton et al. | Nov. 22, 1949 |
| 2,545,493 | Richter | Mar. 20, 1951 |
| 2,621,055 | O'Kelley | Dec. 9, 1952 |
| 2,648,546 | Falkenhagen | Aug. 11, 1953 |
| 2,684,254 | Goss | July 20, 1954 |
| 2,687,309 | Anders | Aug. 24, 1954 |